Jan. 29, 1935.                    R. GUYER                    1,989,316
                        FILLER AND FLAT CONSTRUCTION
                             Filed Feb. 18, 1933
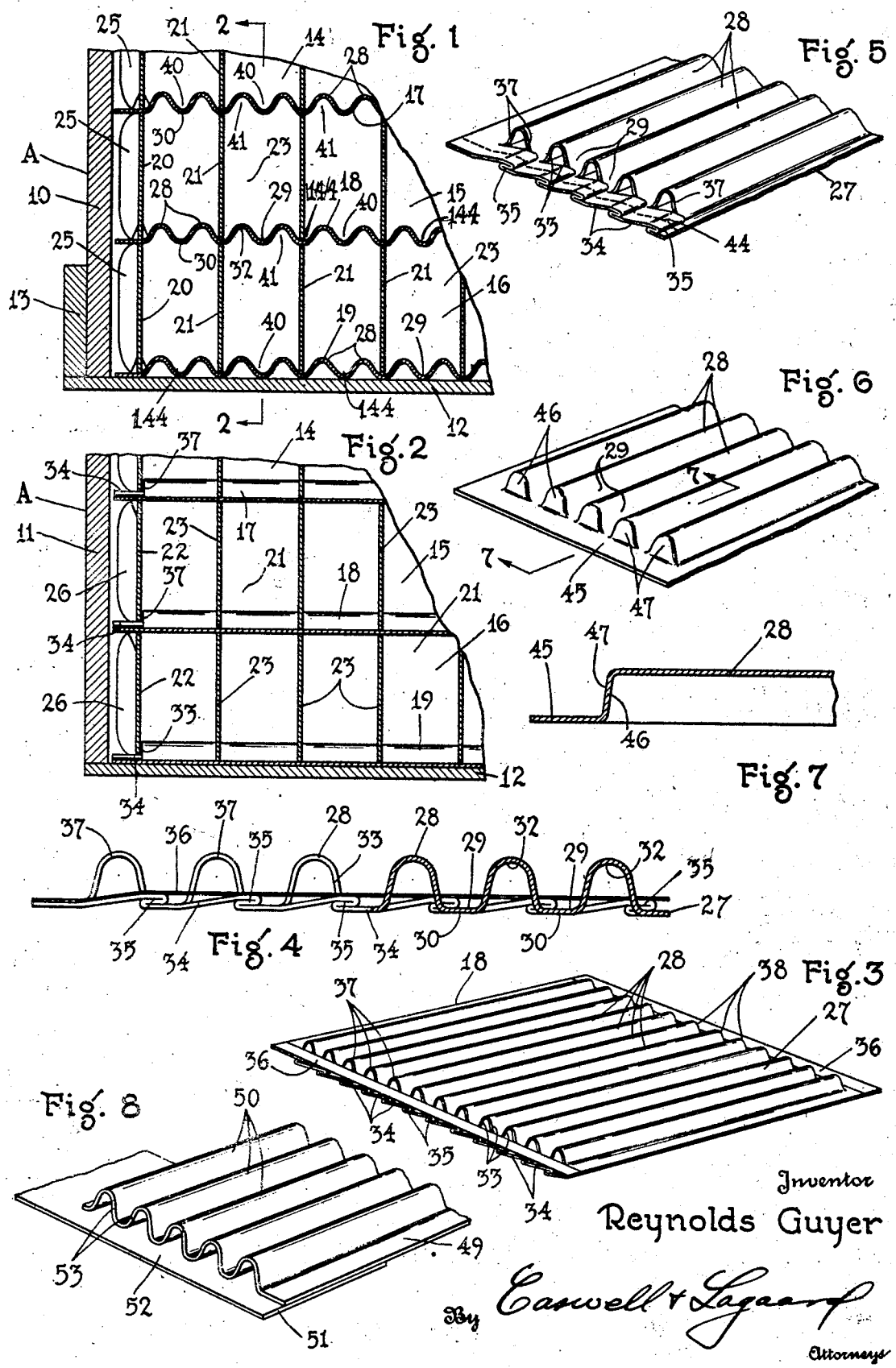
Inventor
Reynolds Guyer
By Caswell & Lagaard
        Attorneys Patented Jan. 29, 1935

1,989,316

UNITED STATES PATENT OFFICE 1,989,316

FILLER AND FLAT CONSTRUCTION

Reynolds Guyer, St. Paul, Minn., assignor to Waldorf Paper Products Company, St. Paul, Minn., a corporation of Minnesota Application February 18, 1933, Serial No. 657,353

3 Claims. (Cl. 217—26.5)

My invention relates to filler and flat construction for egg cases and particularly to the type of filler construction utilizing a set of partitions extending in spaced parallel relation and another set of partitions extending in spaced parallel relation and intersecting said first named partitions to form egg cells therebetween.

An object of the invention resides in providing a construction by means of which the filler may be locked from movement with respect to the surface of the egg flat.

Another object of the invention resides in providing an egg flat comprising a body portion constructed with continuous parallel corrugations thereon coextensive with the egg cells in the direction of said first named partitions and exposed on both sides of the body portion.

A still further object of the invention resides in providing locking devices at the ends of the egg cells for holding the filler from movement relative to the egg flat.

An object of the invention resides in arranging the locking means at the ends of the corrugation.

A feature of the invention resides in constructing the corrugations at the ends thereof with shoulders for engagement with the outermost partitions of the last named partitions.

An object of the invention resides in constructing the body portion of the egg flat with tie members at the ends of the corrugations for holding the corrugations in proper form and in so constructing said tie members as to form shoulders on the corrugations for engagement with certain of the partitions of the egg case fillers.

Another object of the invention resides in providing strips extending along the ends of the corrugations for holding the same in proper form, said strips being disposed in a manner to leave the ends of the corrugations free for the purpose of forming shoulders thereon.

A feature of the invention resides in cutting the body portion of a length substantially equal to the distance between the outer partitions of said last named partitions and in providing strips attached to said corrugations near their ends and projecting outwardly beyond the ends of said corrugations.

Other objects of the invention reside in the novel combination and arrangement of parts and in the details of construction hereinafter illustrated and/or described.

In the drawing:

Fig. 1 is a fragmentary sectional elevational view of a portion of an egg case illustrating the application of one form of my invention thereto.

Fig. 2 is an elevational sectional view similar to Fig. 1 and taken on line 2—2 of Fig. 1.

Fig. 3 is a perspective view of one of the egg flats utilized with the construction shown in Figs. 1 and 2 and removed from the egg case.

Fig. 4 is an end elevational view partly in section of the egg flat shown in Fig. 3 and taken on line 4—4 of Fig. 3.

Fig. 5 is a perspective view of a portion of an egg flat illustrating a modification of my invention.

Fig. 6 is a view similar to Fig. 5 showing still another form of the invention.

Fig. 7 is a sectional view taken on line 7—7 of Fig. 5.

Fig. 8 is a perspective view similar to Figs. 5 and 6 of still another form of the invention.

With filler and flat construction for egg cases in which a corrugated flat is used having the corrugations coextensive with the length of the flat it has heretofore been found difficult to prevent longitudinal movement of the filler with respect to the corrugations of the flat. The present invention provides a simple and effective construction whereby the filler is held from movement with respect to the flat in the direction of the corrugations thereof.

For the purpose of illustrating the application of my invention, I have shown in Figs. 1 and 2, a part of an egg crate or case which is indicated in its entirety at A. This egg case may be constructed in any suitable manner and is provided with walls 10 and 11 and upper and lower closures 12 secured thereto. A number of cleats 13 are attached to the walls 10 and stiffen and reinforce the same and serve to provide means whereby the upper and lower closure 12 may be securely attached to the egg case. Within the case is disposed a number of egg case fillers 14, 15 and 16 which may be constructed in the usual manner and which are separated by egg flats 17 and 18. As many such fillers as are needed may be employed, there being one such egg flat between each filler and the overlying filler. At the bottom of the case and between the lower closure 12 and the filler 16 is disposed a cushion pad 19. A similar pad is disposed at the top of the case. These various parts will now be described in detail.

All of the egg case fillers 14, 15 and 16 being identical in construction, only the filler 15 will be described in detail. This filler consists of a number of longitudinal partitions, the inner partitions being designated by the reference numeral 21 and the outer partition by the reference numeral 20. Said filler further includes transverse partitions of which the outer partitions are designated by the reference numeral 22 and the inner partitions by the numeral 23. These various partitions intersect one another and are secured together either through the ordinary joint or by a locked joint. Such construction being now in common use in egg case filler construction will not be described in detail in this application. The various partitions of the filler are formed with ends 25 and 26 which project outwardly beyond the outer of the intersecting partitions and which extend up toward the walls 10 and 11 of the egg case. These ends are preferably constructed to fall short of the said walls and would hence permit considerable movement relative to the egg flat which fits snugly within said walls. By means of the present invention such movement is greatly reduced and the fillers held in proper position with respect to the egg flats.

Inasmuch as the egg flats 17 and 18 and the cushion pads 19 are identical in construction, only the egg flat 18 will be described in detail, which egg flat is shown detached from the egg case in Fig. 3. This egg flat is constructed from a sheet of paper stock 27 of a length somewhat greater than the length of the egg flat. This sheet is first corrugated by running the same through suitable corrugating rolls which takes up the extra stock of material which forms a number of corrugations in the sheet projecting from both sides thereof. The exact construction of the sheet is best shown in Fig. 4 in which the corrugations extending from the upper side of the sheet are designated by the reference numeral 28. These corrugations are separated by grooves 29 in the sheet also disposed upon the upper side of the sheet. In like manner, on the other side of the sheet and opposite the grooves 29 are formed corrugations 30 which extend in the same direction and which are separated by grooves 32 directly opposite the corrugations 28. In the further construction of the egg flat the corrugated sheet is supported in such a manner that the corrugations are maintained in the desired form. This may be accomplished by running the corrugated sheet between two belts having intermeshing slats thereon constructed in the shape of the corrugations. When such a device is used, the same is of a width less than the total width of the flat so that the ends of the corrugations are free from the supporting means. Where several egg flats are constructed across a single sheet of stock, the slats are discontinued at sections intermediate the ends thereof so that suitable portions of the corrugations conforming with the lateral edges of the egg flats to be constructed therefrom are unsupported at such localities. In the construction of the corrugations the corrugations 28 on the upper side of the sheet are severed as indicated at 33 to separate the ends 34 of the corrugations from the major portions thereof. While the corrugated sheet is supported upon the conveyor, rollers are run over the ends 34 of the corrugations and the same flattened down as clearly illustrated in Fig. 4 causing parts thereof to become doubled back upon themselves as designated at 35. A narrow strip of paper 36 is then glued to the upper surfaces of these portions of the corrugations which hold the same in place and form a rigid construction at the ends of the flat which serve to retain the width of the flat and to hold the corrugations in proper form. This construction leaves shoulders 37 and 38 at the ends of the corrugations which operate to hold the egg case filler from movement as will be presently described.

The lengths of the corrugations 28 and 30 of the egg flat between shoulders 37 and 38 thereof are slightly less than the inner dimension between the outer partitions 22 of the egg case filler. For the purpose of causing the fillers to fit into the grooves 29 and 32 of the corrugations, the upper and lower edges of the partitions 23 are scalloped as indicated at 40 and 41. The scallops 40 fit into the grooves 29 while the scallops 41 fit into the grooves 32 of the various egg flats whereby a tight joint is formed between the egg case fillers and egg flats. This construction also prevents lateral movement of the filler with respect to the flats. The two end partitions 20 of the filler are constructed so that the lower edges 43 thereof lie even with the vertexes 144 of the scallops 40. These edges are constructed without scallops and are adapted to rest upon the marginal portions of the egg flat. In like manner all of the partitions 22 and 23 are constructed so that the lower edges thereof lie flush with the vertexes 144 of the scallops 40. By means of this construction partitions 23 follow along the valleys or grooves 29 between corrugations 28 and the partitions 22 rest upon the strips 36. Due to the fact that the corrugations 28 are of a length slightly less than the distance between the end partitions 22 the said corrugations fit within the end partitions 22 and the shoulders 37 and 38 at the ends of said corrugations abut against the inner surfaces of said partitions. By means of this construction the egg case fillers are firmly held from longitudinal movement with respect to the corrugations of the egg flat.

Instead of utilizing the strip 36 for holding the ends 34 of the body of the egg flat in position with the parts 35 overlapping, the same results may be obtained by the construction shown in Fig. 5. In this figure parts corresponding with the form of the invention shown in Figs. 3 and 4 have been designated by like reference characters. The corrugations 28 at the end portion 34 are constructed in the same manner as the parts 35 and caused to overlie one another, and to form shoulders 37 and 38 at the ends of the corrugations. However, instead of securing the parts 34 in proper position through the strip 36 a sewing machine is employed which stitches the parts together as designated at 44 which serves to hold the end portions of the egg flat intact and to retain the form of the corrugations.

If desired, the entire egg flat may be formed of molded material in which the marginal portion 45 at the ends of the corrugations 28 is formed integral with said corrugations and is connected thereto through end walls 46 closing the ends of the valleys 32. The exact construction is clearly shown in Fig. 7 which is taken through one of the corrugations. By means of this construction, shoulders 47 are formed through the end walls 46, which shoulders serve the same function as the shoulders 37 and 38 and which engage the inner surface of the partitions 22 and hold the egg case fillers from longitudinal movement relative to the corrugations 28.

In Fig. 8 I have shown still another form of the invention in which a sheet of paper 49 is employed which is of a length equal to the distance between the shoulders 37 and 38 of the egg flat shown in Fig. 3. This sheet is corrugated as previously described to form corrugations 50. Along the outer ends of the corrugations 50 and upon the under-side of the sheet are glued strips of paper 51 which extend inwardly of said corrugations for a short distance and which also project outwardly beyond the ends thereof. The projecting portions 52 of the strips of paper extend up toward the end walls 11 of the egg case when the egg flat is inserted therein and serve the same purpose as the portions 34 of the egg flat shown in Fig. 3. By means of this construction, shoulders 53 are formed at the ends of corrugations 50 which operate in identically the same manner as the shoulders 37 and 38 and restrain longitudinal movement of the filler with respect to the egg flat.

By means of my improved egg flat and filler construction the corrugations on both sides of the egg flat may be exposed so that the eggs are directly supported on the corrugations regardless of whether the egg flat is arranged with one surface or the other uppermost. In the construction of the egg flats the corrugations are of such pitch that two corrugations on one side of the sheet and one full corrugation and two half corrugations on the other side of the sheet are included within each egg cell. This causes the eggs when disposed on the upper side of the egg flat to be supported on the two corrugations 28 of the flat disposed within the particular egg cell. When the egg case is handled the two corrugations spread apart and yield without imparting any appreciable shock to the eggs, thereby cushioning the same and preventing breakage thereof.

My invention is highly advantageous in that an extremely simple and effective egg flat and filler construction is provided by means of which breakage of eggs is greatly reduced. Breakage of eggs through endwise movement of the case or in a longitudinal direction with respect to the corrugations is also greatly reduced. The egg flat and filler can be constructed of ordinary paper stock of a relatively low grade thereby greatly economizing in expense. Less paper stock is utilized with my invention than with other forms of egg flats now on the market. By forming the egg flat from paper stock and by thereafter securing the ends of the corrugations in proper position, an appreciable depth of corrugation can be procured so that suitable cushioning of the eggs occurs. Where it has been attempted to press corrugations into a sheet by stretching the stock of the sheet, only relatively shallow corrugations could be procured which have been found to be unsuitable for the desired purpose. Inasmuch as certain of the corrugations extend along the longitudinal partitions of the egg case filler the shoulders on such corrugations lie in proximity to the transverse partitions at the intersections of the partitions. This serves to transmit the impact from the fillers directly to the shoulders through the parts of the filler in proximity to the intersections of the partitions, thereby greatly resisting movement of the fillers with respect to the flats and effectively cushioning the eggs. Due to the use of the scallops on the upper and lower edges of the transverse partitions, the fillers are held from transverse as well as longitudinal movement and substantially closed egg cells provided.

Changes in the specific form of my invention, as herein disclosed, may be made within the scope of what is claimed without departing from the spirit of my invention.

Having described my invention, what I claim as new and desire to protect by Letters Patent is:

1. In combination, an egg case filler having partitions extending in spaced parallel relation and other partitions extending in spaced parallel relation and intersecting said first named partitions to form egg cells therebetween, an egg flat consisting of a body portion having continuous parallel corrugations coextensive with the extent of the egg cells in the direction of said first named partitions and exposed on both the upper and under sides of the egg flat, said body portion being cut near the ends of said egg flat across the upper portions of the corrugations thereof to form members bendable substantially into a plane to form shoulders at the cut portions of the corrugations for engagement with the outer partitions of said last named partitions to hold the filler from movement relative to the egg flat and a strip of material secured to the folded over portions of said body member for holding the same in alignment to retain the form of the corrugations.

2. In combination, an egg case filler having partitions extending in spaced parallel relation and other partitions extending in spaced parallel relation and intersecting said first named partitions to form egg cells therebetween, an egg flat consisting of a body portion having continuous parallel corrugations coextensive with the extent of the egg cells in the direction of said first named partitions and exposed on both the upper and undersides of the egg flat, said body portion being cut near the ends of said egg flat across the upper portions of the corrugations thereof to form members bendable substantially into a plane to form shoulders at the cut portions of the corrugations for engagement with the outer partitions of said last named partitions to hold the filler from movement relative to the egg flat, and an elongated member secured to the folded over portion of said body member for holding the same in alignment to retain the form of the corrugations.

3. In combination, an egg case filler having partitions extending in spaced parallel relation and other partitions extending in spaced parallel relation and intersecting said first named partitions to form egg cells therebetween, an egg flat consisting of a body portion having continuous parallel corrugations coextensive with the extent of the egg cells in the direction of said first named partitions and exposed on both the upper and undersides of the egg flat, said body portion being cut near the ends of said egg flat across the upper portions of the corrugations thereof to form members bendable substantially into a plane to form shoulders at the cut portions of the corrugations for engagement with the outer partitions of said last named partitions to hold the filler from movement relative to the egg flat, and means at the folded over portions of said body member for holding the same in alignment to retain the form of the corrugations.

REYNOLDS GUYER.